Dec. 31, 1929.                G. A. BROOKS                1,741,609
                           ANTIGLARE APPARATUS
                           Filed Dec. 15, 1928
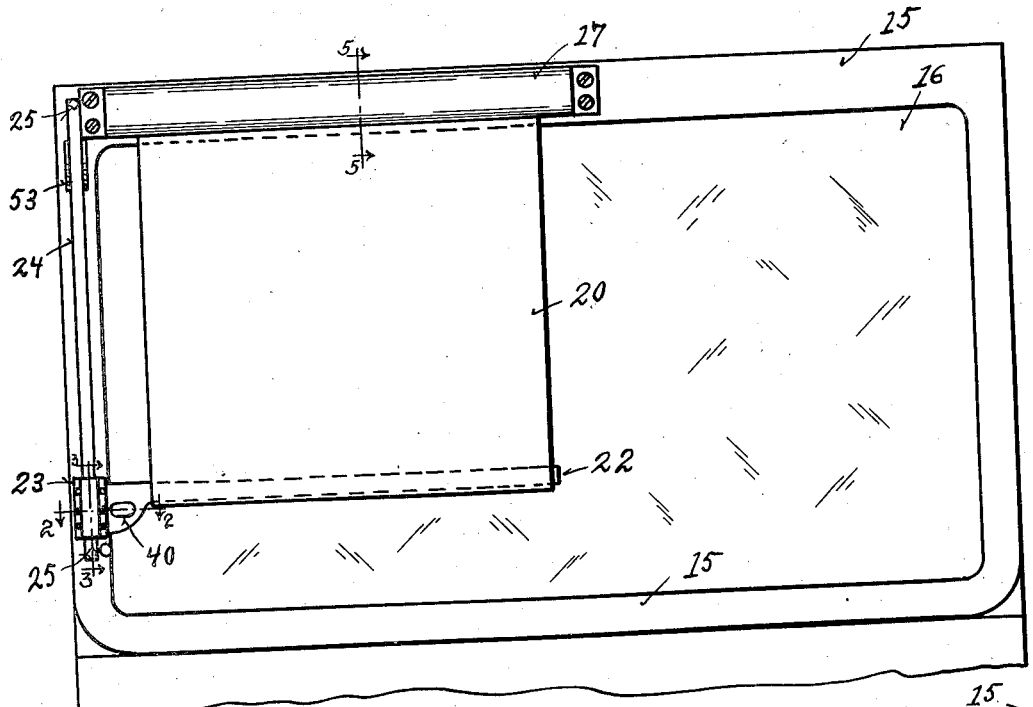
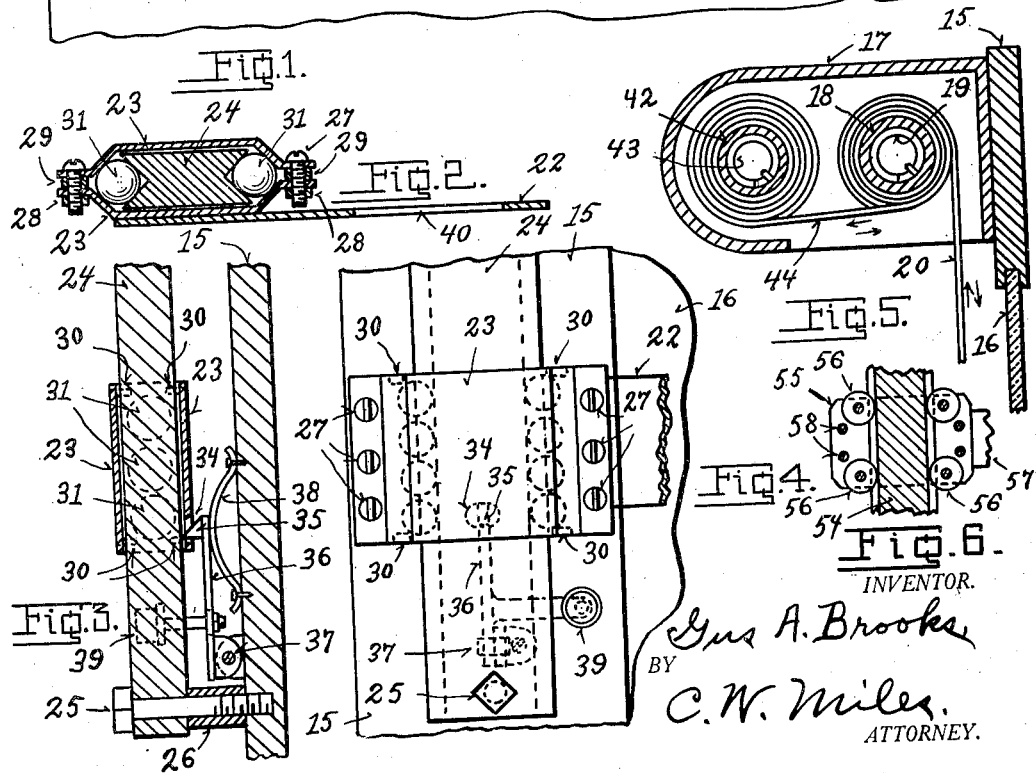
INVENTOR.
Gus A. Brooks
BY C. W. Miles
ATTORNEY.

Patented Dec. 31, 1929

1,741,609

UNITED STATES PATENT OFFICE

GUS A. BROOKS, OF MAYS LICK, KENTUCKY

ANTIGLARE APPARATUS

Application filed December 15, 1928. Serial No. 326,323.

My invention relates to improvements in antiglare apparatus for automobiles. One of its objects is to provide in combination with a vehicle wind shield an adjustable flexible curtain of transparent but colored or tinted material, adapted to intercept a portion of the light rays from approaching vehicle search lights, and thereby prevent the operator of the vehicle from seeing so as to control and direct his vehicle. Another object is to provide improved and convenient means whereby the curtain may be quickly drawn down into position for use or returned to its idle position. Another object is to provide improved means to protect the faces of the curtain from becoming marred and scratched and the transparency of the curtain destroyed through repeated adjustment of the curtain from operative to idle position. Another object is to provide improved curtain supporting and operating means. Another object is to prevent light through from the rear being reflected from the windshield to interfere with operation of the car. My invention also comprises certain details of form and arrangement and combination of components, all of which will be fully set forth in the description of the accompanying drawings, in which:

Fig. 1 is an inside plan of a vehicle wind shield with my improvements applied thereto.

Fig. 2 is an enlarged sectional detail taken on line 2—2 of Fig. 1.

Fig. 3 is an enlarged sectional detail taken on line 3—3 of Fig. 1.

Fig. 4 is an enlarged plan of the apparatus shown in Fig. 3.

Fig. 5 is an enlarged sectional detail taken on line 5—5 of Fig. 1.

Fig. 6 is a sectional detail of a modification.

The accompanying drawings illustrate one embodiment of my invention in which 15 represents a vehicle wind shield frame, and 16 a glass panel mounted in the frame 15. The frame 15 may be mounted in any one of several well known methods relative to the vehicle. Mounted upon the upper cross rail of the frame 15 is a curtain roller housing 17. Within the housing 17 is pivotally mounted a small curtain roller or shade roller 18 of the usual shade roller type having a tensioning spring 19 coiled within the barrel of the roller 18, and adapted to tension the roller so as to cause the curtain 20 to roll upon or about the roller 18 and within the housing 17 when the curtain is stored in its idle or inoperative position. One end of the spring 19 is attached to the roller which is free to rotate relative to the housing, while the opposite end of the spring 19 is attached to a drum on one end of the roller which does not rotate relative to the casing 17, but on which the end of the roller rotates.

One end of the curtain 20 is attached to the exterior of the roller 18 and the opposite end of the curtain 20 is attached to a cross-bar or blade 22 which is movable vertically relative to the frame 15. The blade 22 is attached rigidly to a housing or box 23 which is adjustable vertically upon a vertical bar 24 attached rigidly at opposite ends by means of screws 25 and spacing sleeves 26 to one of the vertical side rails of the frame 15. The box 23 is composed of two substantially duplicate stampings held together by means of screws or bolts 27 and nuts 28 and spaced by means of spacing sleeves 29. At opposite ends the box 23 is provided with inwardly turned lugs 30 which serve to retain the anti-friction balls 31 in place relative to the box 23 and bar 24. Opposite edges of the bar 24 are recessed to form the ball channels or runways. The inner faces of the box 23 are out of contact with the bar 24 except through the balls 31, thereby providing for the box 23 moving readily and without friction. Any lost motion between the box 23 and bar 24 may be taken up through changing the length of the spacing sleeves 29. The box 23 has a slot 34 to receive the free end 35 of a latch member 36 which is pivotally attached to the frame 15 at 37 and is actuated by a spring 38, to cause the free end of the latch to engage the slot 34 and hold the box 23 and blade 22 in their lower position against the tension of the spring 19. A push button 39 carried by the latch 36 enables the latch 36 to be readily released from the box 23 whereupon the spring 19 rolls the curtain upon the roller 18. The blade 22 has a recess 40 into which a finger of the operator may be introduced and serve to draw the blade and curtain quickly down into operative position where the latch 36 engages the recess 34 to retain the box 23 and blade 22 in their lower operative position as shown in Fig. 1.

In order that the faces of the curtain 20 may not be scratched or marred and the curtain 20 thus converted from a transparent to a translucent curtain, I provide a curtain roller 42 similar to the roller 18, and actuated similarly by means of a spring 43. A curtain or shade 44 composed of felt, silk or other textile or cushioning material is adapted to protect the faces of the curtain 20 from injury when rolled and unrolled from the roller 18. The curtain 44 is attached at one end to the roller 42, and its opposite end is attached to the roller 18, so that when curtains 20 and 44 are rolled together upon the roller 18, the curtain 44 is interposed between opposite faces of the curtain 20 to prevent contact of faces of the curtain 20 with each other, and thereby keeps the faces of the curtain 20 free from injury. The spring 43 is opposed to the spring 19, but the spring 19 is of stronger tension than the spring 43. The curtains 44 and 20 are thus held under tension at all times, and operate freely when released to roll both curtains upon the roller 18. All the parts are self-contained upon the frame 15, which may be adjusted to any desired position without interference therefrom. The curtain 20 may be tinted or colored orange, green, or in similar manner to enable the curtain 20 to intercept any light rays desired which would tend to blind an operator or interfere with his control of his vehicle. The curtain 20 is also adapted to be used to advantage where strong sun-light is liable to be reflected or thrown into the face of an operator. The curtain 20 also serves to absorb and prevent reflection of a portion of any light which may reach the curtain 20 from or through the rear of the vehicle, thereby preventing objectionable light from the rear being reflected from the wind-shield into the eyes of the operator. As soon as the use of the curtain 20 is no longer required, it may be instantly released and returned to its inoperative position. My improved apparatus is adapted to be applied right or left handed to the wind shield or to any glazed aperture of an automobile.

A buffer spring 53, see Fig. 1, serves to engage the housing 23 yieldingly at the upper extremity of its movement and thereby bring the housing 23 and blade 22 slowly and without excessive jar to a rest, and also avoid excessive strain upon the rollers or upon the curtains due to a sudden stoppage of the housing 23.

In modification Fig. 6 I have shown a bar 54 corresponding to the bar 24 of Fig. 1, with channels in its edges, and a housing 55 corresponding to the housing 23, which is provided with pivotally mounted rollers 56 traveling in the channels of the bar 24, in place of the balls 31 shown in Fig. 2. The housing members are attached together by means of screws or bolts 58 corresponding to the bolts 27 of Fig. 2. A blade 57 corresponding to the blade 22 of Fig. 2 is attached to the housing 55.

The apparatus herein shown and described is capable of considerable modification within the scope of the claims without departing from the spirit of my invention.

What I claim is:—

1. In combination with a windshield, a light intercepting curtain, a curtain roller rotatably mounted upon said windshield and to which the upper edges of said curtain are attached, a vertical guide attached rigidly to said windshield, a blade attached to the other end of said curtain, a box attached to said blade and adapted to slide in a plurality of ditions on said vertical guide, said box consisting of a plurality of stampings, anti-friction members and means for fastening said stampings together to clamp said anti-friction members on said vertical guide, and a latch to retain said curtain to a lower position when said curtain has been unwound from said roller.

2. In combination with a windshield, a light intercepting curtain, a curtain roller rotatably mounted upon said windshield and to which the upper edges of said curtain are attached, a vertical guide attached rigidly to said windshield, a blade attached to the other end of said curtain, a box attached to said blade and adapted to slide in a plurality of directions on said vertical guide, said box consisting of a plurality of stampings, anti-friction members and means for fastening said stampings together to clamp said anti-friction members on said vertical guide, and a latch to retain said curtain to a lower position when said curtain has been unwound from said roller, said latch having means cooperating with said box.

In testimony whereof I have affixed my signature.

GUS A. BROOKS.